(12) United States Patent
Rapoport et al.

(10) Patent No.: US 7,637,289 B1
(45) Date of Patent: Dec. 29, 2009

(54) SECTIONAL HEAT INSULATING JACKET

(76) Inventors: Yevgeny Rapoport, 2800 W. Peterson Ave., #205, Chicago, IL (US) 60659; Ben Boris Schwartz, 714 Valley Rd., Glencoe, IL (US) 60022; Ian Kogan, 2285 Bragg St., 3E, Brooklyn, NY (US) 11229

( * ) Notice: Subject to any disclaimer, the term of this patent is extended or adjusted under 35 U.S.C. 154(b) by 0 days.

(21) Appl. No.: 12/031,356

(22) Filed: Feb. 14, 2008

Related U.S. Application Data

(63) Continuation of application No. 11/026,760, filed on Dec. 30, 2004, now abandoned.

(60) Provisional application No. 60/569,398, filed on May 8, 2004.

(51) Int. Cl.
*F16L 9/14* (2006.01)

(52) U.S. Cl. .................. 138/149; 138/152; 138/159; 138/169

(58) Field of Classification Search ............ 138/149, 138/159, 169, 152
See application file for complete search history.

(56) References Cited

U.S. PATENT DOCUMENTS

| | | | | |
|---|---|---|---|---|
| 1,661,254 A * | 3/1928 | Gillies | ............... | 138/147 |
| 2,656,902 A * | 10/1953 | Gotshall | ............... | 52/511 |
| 3,082,849 A * | 3/1963 | Keller | ............... | 52/475.1 |
| 3,523,395 A * | 8/1970 | Rutter et al. | ............... | 52/410 |
| 3,590,540 A * | 7/1971 | Johnson et al. | ............... | 52/309.13 |
| 3,882,382 A * | 5/1975 | Johnson | ............... | 324/694 |
| 3,909,907 A * | 10/1975 | Davis | ............... | 29/407.1 |
| 3,911,961 A * | 10/1975 | Peyton et al. | ............... | 138/113 |
| 4,300,323 A * | 11/1981 | Meechan et al. | ............... | 52/464 |
| 4,437,286 A * | 3/1984 | Maguire | ............... | 52/506.05 |
| 4,442,585 A * | 4/1984 | McGehee et al. | ............... | 29/432 |
| 4,677,731 A * | 7/1987 | Sommerer et al. | ............... | 29/525.12 |
| 5,437,312 A * | 8/1995 | Gumangan et al. | ............... | 138/149 |
| 5,441,083 A * | 8/1995 | Korsgaard | ............... | 138/149 |
| 5,654,060 A * | 8/1997 | Holman et al. | ............... | 428/68 |
| 5,713,394 A * | 2/1998 | Nygaard | ............... | 138/149 |
| 5,783,268 A * | 7/1998 | Noonan et al. | ............... | 428/34.5 |
| 5,918,644 A * | 7/1999 | Haack et al. | ............... | 138/151 |
| 6,695,016 B2 * | 2/2004 | Buck | ............... | 138/149 |
| 6,755,218 B2 * | 6/2004 | Whitty | ............... | 138/149 |

* cited by examiner

*Primary Examiner*—James F Hook
(74) *Attorney, Agent, or Firm*—John D. Gugliotta, PE, Esq

(57) ABSTRACT

A sectional heat insulation jacket comprises a set of multilayer insulation sections in which the layers are bound together by a fastening and fixing device. Adjacent insulation sections connect and they separate by assembling joints that are self-sealing. A mutual position of the adjacent sections is reliably fixed by the connecting device at each stage of heating. The self-sealing is accomplished by side flexible layers which incline under a sharp angle to the surface of an upper flexible layer. The sizes of the assembling joints between adjacent sections at levels of the upper and the bottom flexible layers are equal to the temperature expansions of these layers in longitudinal and transverse directions, correspondingly under the insulated entity's heating until an operating temperature is reached. A conical, helical spring shaped fastening rod further increases a length of metallic inclusions with high thermal conductivity form an insulated entity and reduces heat loss.

19 Claims, 11 Drawing Sheets

Not to overload the drawing detales 28 (#2, #4 in FIG.3A) in the cross-sectional view are not shown

| (1.1) | $L(I;1b) = L(I;1a) * K(I;s) / [1 + alpha(1) * [T(o;1e) - T(o;1b)]]$ |
|---|---|
| (1.2) | $L(II;1b) = L(II;1a) * K(II;s) / \{1 + alpha(1) * [T(o;1e) - T(o;1b)]\}$ |
| (2.1) | $L(I;2b) = L(I;2a) * K(I;s) / \{1 + alpha(2) * [T(o;1e) - T(o;1b)]\}$ |
| (2.2) | $L(II;2b) = L(II;2a) * K(II;s) / \{1 + alpha(2) * [T(o;2e) - T(o;2b)]\}$ |
| (3.1) | $beta(I) = arc\ tg\ \{\{L(I;1b) * alpha(1) * |T(o;1e) - T(o;1b)| - L(I;2b) * alpha(2) * |T(o;2e) - T(o;2b)|\}/2delta$ |
| (3.2) | $beta(II) = arc\ tg\ \{\{L(II;1b) * alpha(1) * |T(o;1e) - T(o;1b)| - L(II;2b) * alpha(2) * |T(o;2e) - T(o;2b)|\} / 2delta$ |
| (4) | $0.82*lambda(o) * [T(o;1e) - T(o;hc)] * (d/D)^2 / \{alpha(o) * T(o;hc) - T(o;2b)]\}$ |
| (5.1) | $L(I;m) = 0.5 * [L(I;1b) + L(I;2b)] + DELTA(I;m)$ |
| (5.2) | $L(II;m) = 0.5 * [L(II;1b) + L(II;2b)] + DELTA(II;m)$ |
| (5.3) | $DELTA(I;m) = x * delta * K(I;s)$, wherein x is between 0.5 and 0.95 |
| (5.4) | $DELTA(II;m) = x * delta * K(II;s)$, wherein x is between 0.5 and 0.95 |

FIG. 6

| | |
|---|---|
| L(I;1b) | initial length of bottom 1 sheeting in a longitudinal direction I under ambient temperature of fabrication T(o;1b) |
| L(II;1b) | initial length of bottom 1 sheeting in a transverse direction II under ambient temperature of fabrication T(o;1b) |
| L(I;2b) | initial length of upper 2 sheeting in a longitudinal direction I under ambient temperature of fabrication T(o;2b) |
| L(II;2b) | initial length of upper 2 sheeting in a transverse direction II under ambient temperature of fabrication T(o;1b) |
| L(I;1a) | adopted according to structural design between joint axis of continuous sections in longitudinal I direction, at the bottom 1 sheeting level |
| L(II;1a) | distance between center lines of section joints in transverse II direction, at the bottom 1 sheeting level |
| L(I; 2a) | distance between center lines of section joints in longitudinal I direction, at the upper 2 sheeting level |
| L(II;2a) | distance between center lines of section joints in transverse II direction, at the upper 2 sheeting level |
| alfa(1) | temperature linear expansion coefficient of bottom 1 sheeting (reference book data) |
| alfa(2) | temperature linear expansion coefficient of upper 2 sheeting (reference book data) |
| T(o;1b) | initial temperature of bottom 1 sheeting |
| T(o;2b) | initial temperature of upper 2 sheeting (the designed ambient air temperature) |
| beta(I) | slope angle of end faces of joint insulation sections in a longitudinal direction towards a joint axis between them |
| beta(II) | slope angle of end faces of joint insulation sections in a transverse direction towards a joint axis between them. |
| T(o;1e) | final temperature of bottom 1 sheeting under operation |
| T(o;2e) | final temperature of upper 2 sheeting under operation |
| K(I;s) | "joint reduction" coefficient in longitudinal direction; Between 1.000 and 1.006 dependant on middle layer material |
| K(II;s) | "joint reduction" coefficient in transverse direction; Between 1.000 and 1.006 dependant on middle layer material |
| DELTA | total insulation section thickness, includes both bottom and upper sheeting |
| L(hc) | a required, uncoiled length of the conical helical spring to minimize heat loss |
| T(o;hc) | a temperature at an end of the spring near the upper surface of the insulation heating section |
| d = 2r | a diameter of the helical spring rod |
| D = 2R | a diameter of the self-locking washer rigidly fixed at a top of the helical spring inside the last, flat coil |
| alpha(o) | convection heat transfer coefficient from the insulation section surface to the ambient air temperature with consideration of the radiant heat transfer coefficient of the upper sheeting material |
| lambda(o) | thermal conductivity of fastening rod material |
| 0.82 | Empirical coefficient taking into account additional convection and radiant heat transfer into the insulating layer |
| L(I;m) | an initial length of the insulation section on the level of the bottom ledge top or the top ledge bottom in a longitudinal direction at assumed temperature of fabrication |
| L(II;m) | an initial length of the insulation section on the level of the bottom ledge top or the top ledge bottom in a transverse direction at assumed temperature of fabrication |
| DELTA(I;m) | an initial width of the insulation section on the level of the bottom ledge top or the top ledge bottom in a longitudinal direction at assumed temperature; dependent upon the insulation section's total thickness and middle layer material |
| DELTA(II;m) | an initial width of the insulation section on the level of the bottom ledge top or the top ledge bottom in a transverse direction at assumed temperature; dependent upon the insulation section's total thickness and middle layer material |

FIG. 7

SECTIONAL HEAT INSULATING JACKET

RELATED APPLICATIONS

The present invention is a continuation of U.S. Ser. No. 11/026,760 filed on Dec. 30, 2004, now abandoned claiming benefit of U.S. Provisional Patent Application Ser. No. 60/569,398, filed May 8, 2004. The subject matter of both ('760) and ('398) is incorporated by reference herein as if it is rewritten in its entirety, now abandoned.

BACKGROUND OF THE INVENTION

1. Field of the Invention

The present invention relates to a sectional heat insulation jacket and, more specifically, to a jacket that comprises a set of multi-layer insulation sections having assembling joints that are self-sealing. The self-sealing is accomplished at operational temperature by means of side flexible layers configured in such a way as to accommodate differential thermal expansion within a section thickness and to allow the section joints to self-seal. The sizes of the assembling joints between adjacent sections at levels of the upper and the bottom flexible layers are equal to the temperature expansions at corresponding levels.

2. Description of the Related Art

There is taught in U.S. Pat. No. 4,696,324, to Retronco, a multi-functional insulation section(s) fabricated in a form of two half-sections which are combined in a unitary assembly with buckles and straps. To compensate for differential temperature expansions between a pipe and the insulating sections, temperature seams are provided between the insulating blocks. These seams are filled with inserts of semi rigid fiberglass or heat insulating straps. The temperature insert contracts from 75 millimeters (mm) to 40 mm during installation. An outer strap then covers the temperature insert to provide a means to provide a free displacement of the adjoining block about the strap. Drawbacks of the described construction include both substantial time and labor expenditures to mount and to dismount. A further drawback is apparent in emergency situations: it is difficult to find an exact location of a damaged site in order to provide a quick access.

There are many assemblies known for different types of units, joints of equipment, pipes and pipe accouterments. U.S. Pat. No. 5,158,114 to Botsolas teaches a pipefitting cover to enclose an insulated Y-shaped joint, wherein the cover comprises two half-sections formed from pressed aluminum foil, coated with a plastic and then connected with adhesive tape. Different operational conditions determine a type of joint required to connect the half sections of the covers. The following references teach connections:

U.S. Pat. No. 4,553,308 to Botsolas teaches special metal pins;

U.S. Pat. No. 5,025,836 and U.S. Pat. No. 4,669,509, both to Botsolas teach different tapes, including adhesive tapes, screws and rivets;

U.S. Pat. No. 4,207,918 to Burns and U.S. Pat. Nos. 4,696,324 and 4,696,324, both to Retronko, teach miscellaneous metal belts; and, U.S. Pat. No. 4,142,565 to Plunket teaches metal hooks.

Many of the foregoing references enable an effective and a convenient process to join separate insulation sections; however, there is a need to reduce a quantity of fasteners applied to each individual jacket. Disadvantages to the quantities taught in the references include a more complicated construction, a labor intensive installation and a loss of heat from the jacket joints.

There is known a removable insulation jacket comprised of at least two sections to cover a pipe junction completely: U.S. Pat. No. 3,724,491 to Knudsen teaches every section comprising protective metal layers formed in a closed jacket having insulation material inside. A protective inner shell diameter corresponds both to an outer pipe diameter and to adjacent jacket sections that have a face overlapping ledge connected with screws. Drawbacks associated with this insulation construction include a complicated production process, non-hermetic seams between adjoining joints, unnecessary heat loss due to many heat conductive inserts and difficult insulation and removal.

There is also known pipe-insulation products comprising varied shaped configurations to cover combinations of different constructions, pipe fittings, accouterments, etc. U.S. Pat. No. 3,557,840 to Maybee teaches a preliminary formed unitary heat insulating construction comprised of joined rigid heat insulating foam plastic elements fastened onto a covering layer with a porous foam plastic surface that has truncated V-shaped grooves to secure a good connection of the joined elements in operation. In so doing, the necessity to make chamfers restricts an application of this construction because of the strictly determined insulated surface curvature radius that demands many machine-tool attachments to accommodate different types of products.

A heat insulation means for power equipment inner surfaces in a form of panelments fastened to an insulated shell with metal fasteners is described in SU 1010141, G21 c 13/00, F 16 L 59/00, 1981. This arrangement provides better heat technology performance, but it is a more complicated construction. SU 1540413 teaches a shield heat insulation covered with a protective strap for high temperature equipment. The ('413) patent more specifically teaches a means for compensation of heat extensions made as V-shaped flexible elements, wherein a flange surface comprised on them is covered with the protective strap. There is a measure to avoid in this construction; namely, convection stream metal shield pack rigidly linked from two adjacent sides to the elastic V-shaped element, which under operational temperature growth allows the shield and protective sheets to expand freely without construction temperature tension.

Thermohelp, a Chicago and a Canadian company, produce removable and reusable insulations for heat exchangers and hot pipes. These insulations most closely relate to the heat saving construction verses operational temperature range and design features. Analogous products used to insulate gas turbines, steam pipes, etc. are manufactured by Techorizons of America, Inc., Insultec, Inc., and Remco Technology, Inc. In general, these insulation products represent multi-layered flexible and semi-rigid insulating covers that comprise an inner, middle insulating layer and an outer protective layer sheeting. The inner layer is made of light, soft or elastic fibers and highly effective heat insulating materials having a standard thickness. They are manufactured in a form of rolls or mats. The outer, upper and bottom layer sheetings are manufactured from certified film, fabric or sheet materials having guaranteed longevity, temperature resistance, fire resistance and a resistance to water, air, oil, acids and other aggressive chemicals. A common drawback of the majority of removable insulation products is non-hermetic joints between adjacent sections of the insulating cover. A presences of multiple heat conducting inserts results in unnecessary heat loss, a loss of expensive technological energy and an increased financial expenditure.

SUMMARY OF THE INVENTION

It is an object of the present invention to provide a sectional, insulating jacket(s) for technological equipment including, but not limited to, turbines, engines, boilers, valves and various pipelines connections and appurtenances. It is an object that the insulating jackets insulate from both heat and sound and that they are capable of repeated use.

It is an object to increase the efficiency of the protection assembly for entities operating under elevated and extreme temperatures and/or with a high noise level. It is an object that the foregoing is accomplished by means of "self-sealing" assembling joints between contiguous insulation sections. It is an object that these joints are capable of controllable reduction at a stage of operation.

It is an object to simplify the installation and the dismantling of the heat protection assembly installation such that a reliability of the insulating assembly is increased due to an application of the universal integrated fastening and connection means, such means which provide a connection of the insulation sections' layers during installation and heating. It is an object that these means simultaneously secure the constant and uniform assembly thickness and mutual position of the contiguous insulation sections after the "self-sealing" of the assembling joints between them.

It is an object to provide an airtight sealing of the heat protection assembly joints by means of inclined side flexible layers forming them. The sizes of the assembling joints between adjacent sections at levels of the upper and the bottom flexible layers, are equal to the temperature extensions at corresponding leves.

It is an object to provide an airtight sealing of the heat protection assembly joints by means of a use of special joint fillers braids. It is an object that these fillers are fabricated out of an elastic braid fixed on the adjacent insulation sections' side flexible layers. The braid completely fills the assembling joints during a temperature expansion of the insulation sections.

It is an object of the present invention to reduce heat loss significantly through the assembling joints and through the fastening and connection means of the heat protection assembly, which are attributed to the "self-sealing" effect of the assembling joints, wherein essential heat loss decreases through the fastening means owing to their original design.

It is a further object that a shape of the insulated entity's external surface can be diverse; there is no limitation to size or configuration. This advantage enables a use of the invention for a variety of technological equipment ranging from turbines, engines etc. any valves or connections of pipes with a shape and form exclusively individual without limitation.

The present invention is a sectional heat insulation jacket comprising a set of multi-layer insulation sections in which the layers are bound together by fastening and fixing means. Adjacent insulation sections connect as a whole and they separate by means of assembling joints. The assembling joints are self-sealed. A mutual positioning of the adjacent sections is reliably secured by the connecting means at each stage of heating. The self-sealing is accomplished due to the original insulation sections' shape, but it is carried out by means of side flexible layers which incline under a sharp angle to the surface of an upper flexible layer. The sizes of the assembling joints between adjacent sections at levels of the upper and the bottom flexible layers are equal to the temperature expansion of these layers in longitudinal and transverse directions, correspondingly due to the insulated entity's heating until an operating temperature is reached.

BRIEF DESCRIPTION OF THE DRAWINGS

The advantages and the features of the present invention are better understood with reference to the following more detailed description and claims taken in conjunction with the accompanying drawings, in which like elements are identified with like symbols, and in which:

FIG. 5 is a fragment of an insulation section shown in FIG. 4a;

FIG. 6 is a dimensions table for the sectional jacket, wherein the dimensions are defined by formulas recited in the table; and, FIG. 7 is a table that defines each reference character utilized in the formulas of Table 6.

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
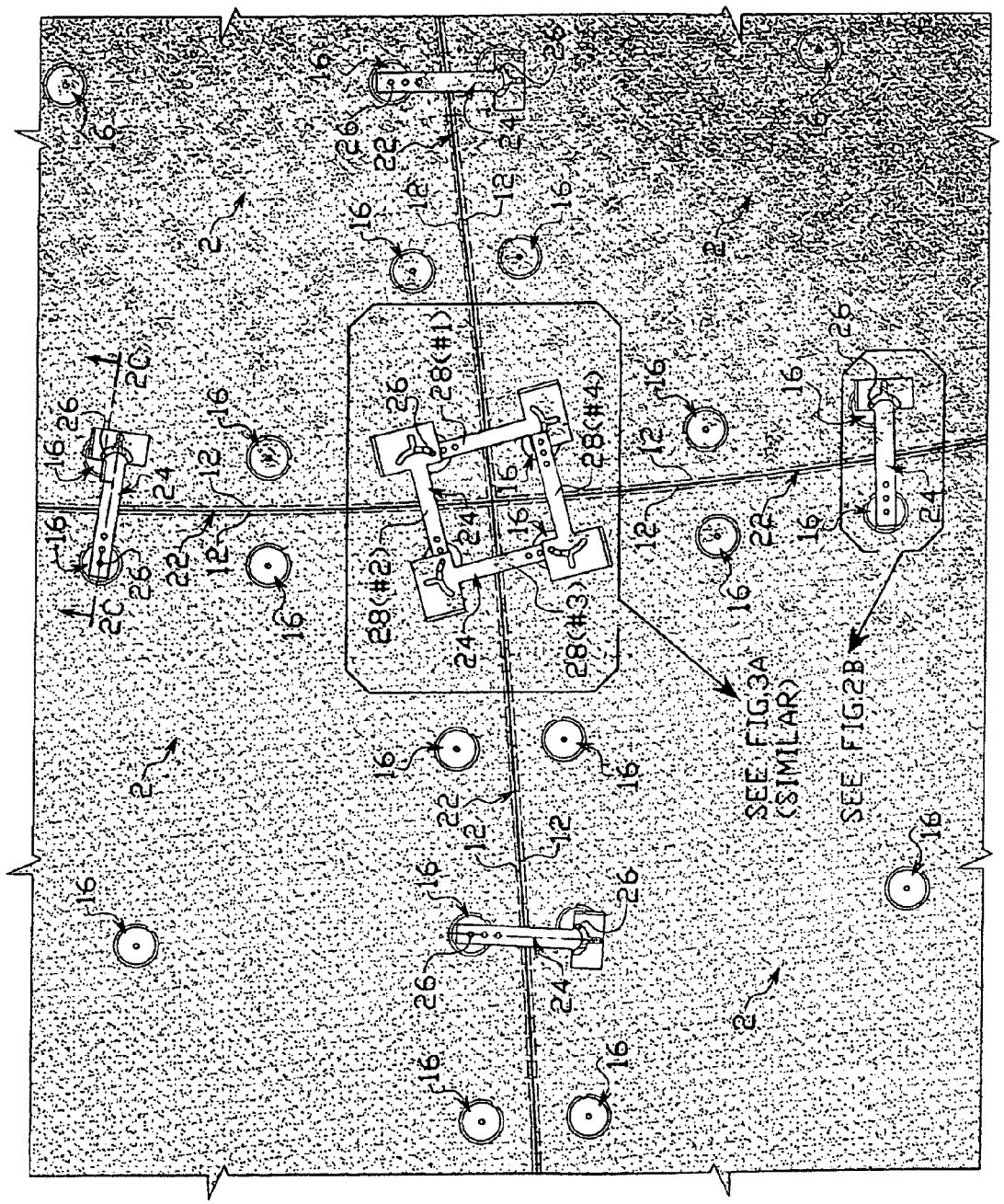
FIG. 1 is a perspective view of a first embodiment of a sectional heat insulating jacket for an entity having a curvilinear external surface (boiler) at a stage of operation.

A perspective view of a first embodiment of a sectional heat insulating jacket is shown in FIG. 1, wherein multi-layered insulation sections 2 (hereinafter "insulating sections") are shown for purposes of insulating process equipment, for example, a curvilinear external surface, s.a., a boiler (referred to as a boiler herein for purposes of enabling the invention). The insulating sections 2 are not limited to insulating the present entity, but they may rather be used to insulate technological equipment that include turbines, engines, boilers, valves and various pipelines connections and appurtenances.

Figure 2A:
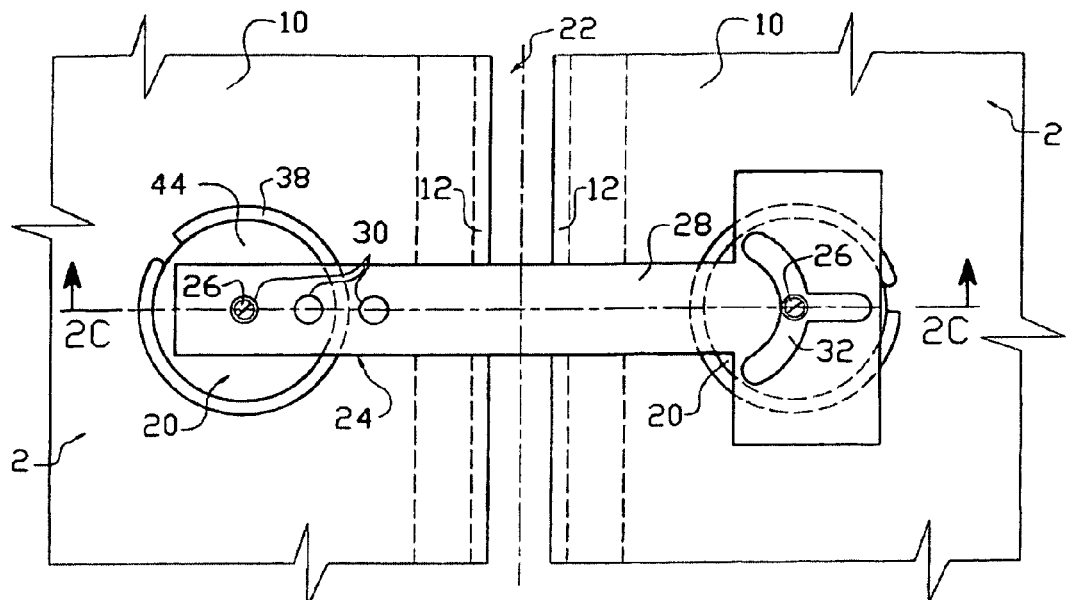
FIG. 2a is a partial view of insulation sections of the jacket shown in FIG. 1 at a stage of installation.
Figure 2B:
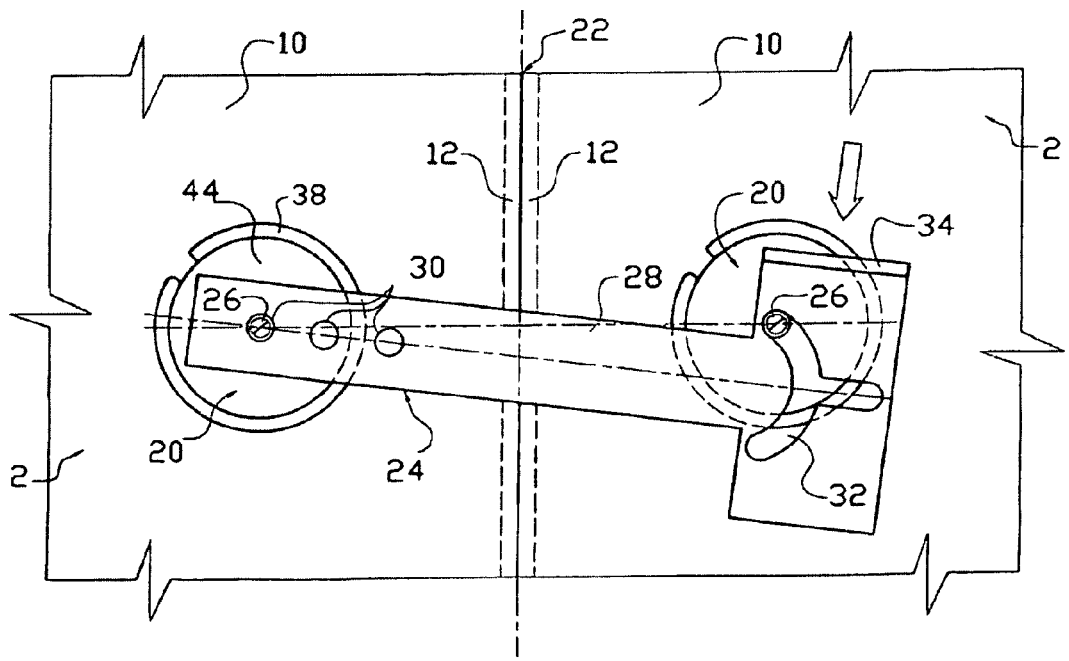
FIG. 2b is a partial view of insulation sections of the jacket shown in FIG. 1 at a stage of operation.
Figure 2C:
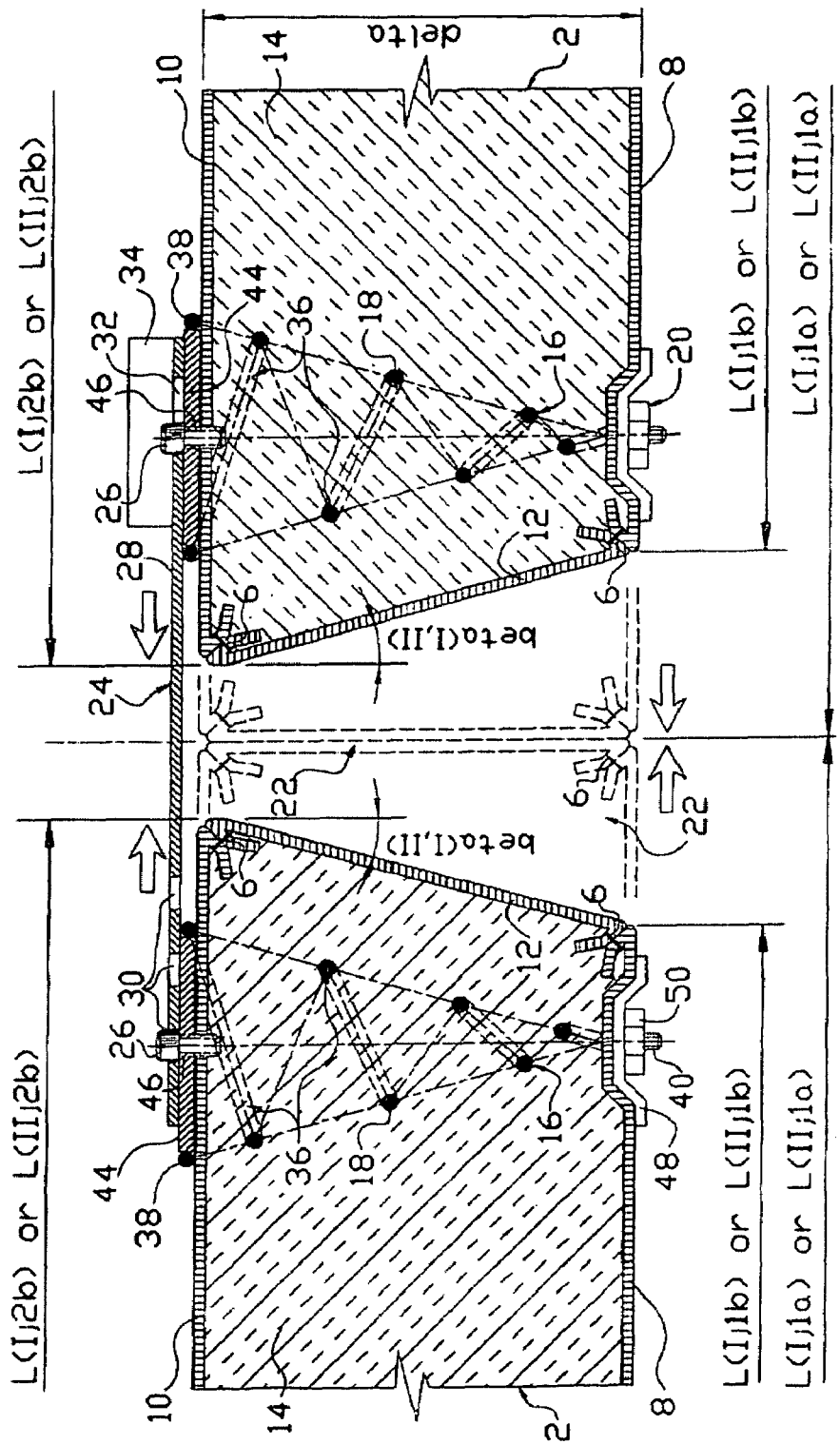
FIG. 2c shows a cross-section taken along lines I-I of FIG. 2a, wherein a direction of self-sealing movement is shown.

FIGS. 2a-c are the cross-sections of the insulating sections 2 shown in FIG. 1. Each section 2 comprises a closed, polyhedral, protective housing 4 which is formed by thread stitched seams 6. A bottom flexible layer 8 inverts to insulate the hot surface of the boiler. The bottom layer 8 tightly wraps around the surface such that there is negligible clearance. An upper, flexible layer 10 is equally spaced from the bottom flexible layer 8 along an entire surface of the insulation section(s) 2. Side flexible layers 12 incline under a sharp angle [90° minus beta(I,II)] to the top flexible layer 10 when installed; side flexible layers are perpendicular to the surfaces of both the bottom layer 8 and the upper layer 10 at the stage of operation. All side flexible layers 12 also have that same configuration on adjacent insulation section(s) 2. A middle, semi-rigid insulation forming layer 14 is placed inside each section's 2 housing 4. Each insulation section 2 is supplied with a special fastening means 16, which is placed equidistantly.

A first embodiment of the fastening means 16 comprises a fixing means 20 to fasten rods 18 on the surface of the insulation section 2. Adjacent insulation sections 2 separate from each other by means of assembling joints 22; they also connect to form a flush whole by means of connection means 24 which are distributed along a perimeter of joining sections 2 in a corresponding, regular order. The connection means 24 comprise special studs 26 which are fixed on the fastening rods 18 and coupled with a special plate-clamp 28. The plate 28 comprises a T-form shape having at least two round holes 30 at the plate's narrow end and an arched slot 32 at the broader, opposite end. A flange 34 comprised on the broad end of the plate 28 provides a means to turn the plate around one of the fastening rods 26. During each intermediate step of heating, the side layers of adjacent insulation sections move towards center line of the assembling joint such that mutual positions of fastening means 16 gradually reach a final position and secure in the final position by means of the plate-clamp 28 after the assembling joint 22 sealed (herein referred to as "self-sealing").

The presence of the same fastening means 16, placed in a certain pattern on all surfaces of the insulation sections 2, also affects the self-sealing of the assembling joints 22. The fastening rods 18 screw into the insulation section 2 body; they are fixed on both the bottom 8 and the upper 10 flexible layers by the special fixing means 20. The different means for each variant fixing secure constant and uniform insulation section's 2 thicknesses while simultaneously binding the layers 8, 10,14 together. A design of the fastening and the fixing means 16, 20 cause the upper 10 and the bottom 8 layers to move towards the center of the assembling joints 22 during heating, wherein movement is accomplished from the side of the bottom flexible layer 8 without a protrusion of the upper flexible layer 10.

In an embodiment of the fastening means 16, shown in FIG. 2c, the fastening rod is manufactured from a heat-resistant stainless steel. An example of the embodiment comprises a conical helical spring 36 having a height equal to a thickness of the insulation section 2. It further comprises a flat coil 38 at a spring top and a straight axial part 40 with a thread 42 at the opposing end. A length of the conical spring (uncoiled) is 2 to 6 times greater than a thickness of the overall insulation sections. The length is determined by the formula defined as equation 4 in FIG. 6. Fixing means 20 comprises an abutment washer 44 having a threaded hole 46 for the stud 26 rigidly fixed in the center of the flat coil 38. Fixing means 20 further comprises a self-locking washer 48 and a locking nut 50 screwed with a thread 42 on the straight axial part 40 of the spring. A fastening unit of the rod 18 is shown in a large scale in FIG. 2c, wherein the stud 26 is screwed into the abutment washer 44. The plate-clamp allows a gradual fastening of adjacent insulation sections as they expand under heating from 150-1200° C. It is preferred that the polymer rods 18 are nonmetallic polymer.

Figure 3A:
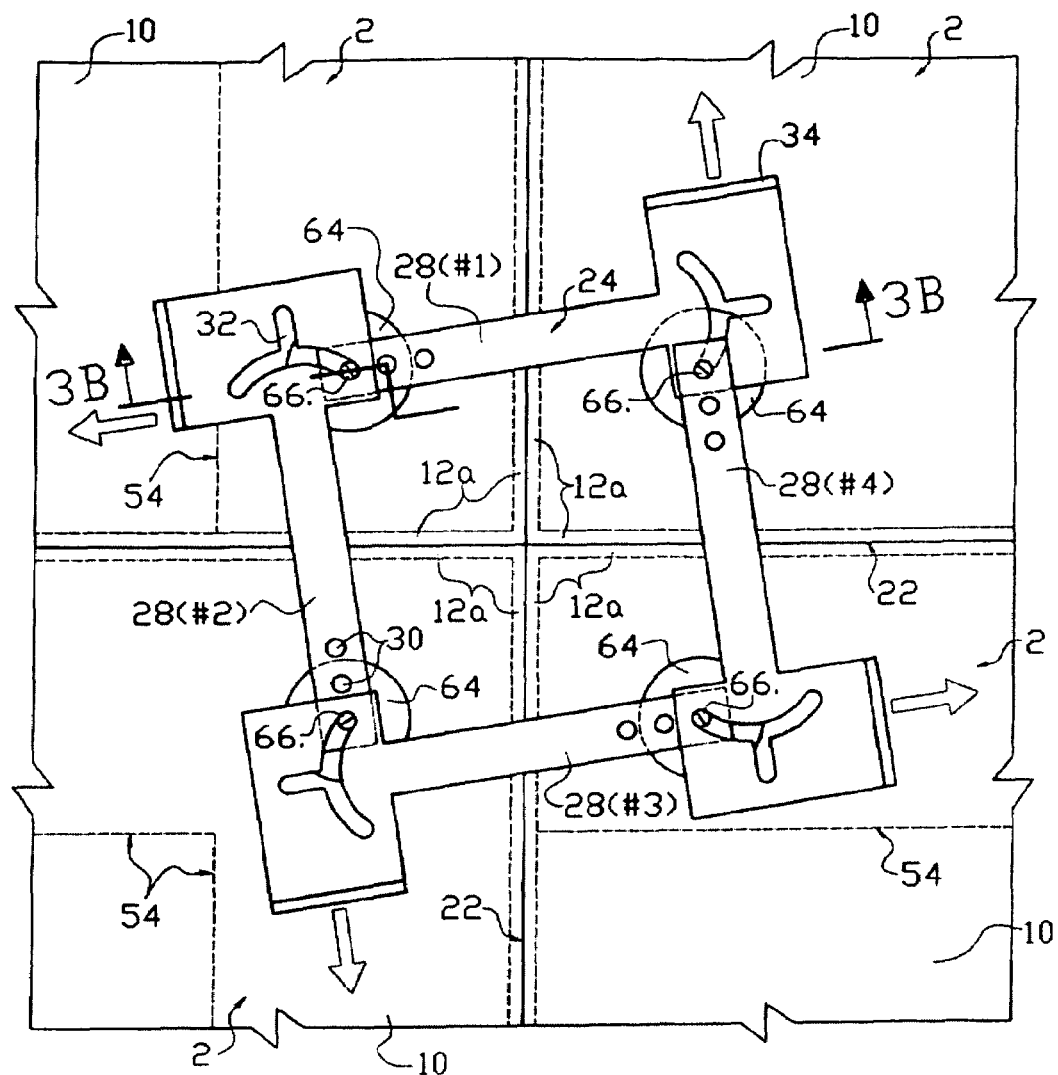
FIG. 3a is a partial view of insulation sections of the jacket shown in FIG. 1, wherein a second embodiment of the present invention comprises a top view at a connection point of four adjacent insulation sections is shown utilizing a ledge.
Figure 3B:
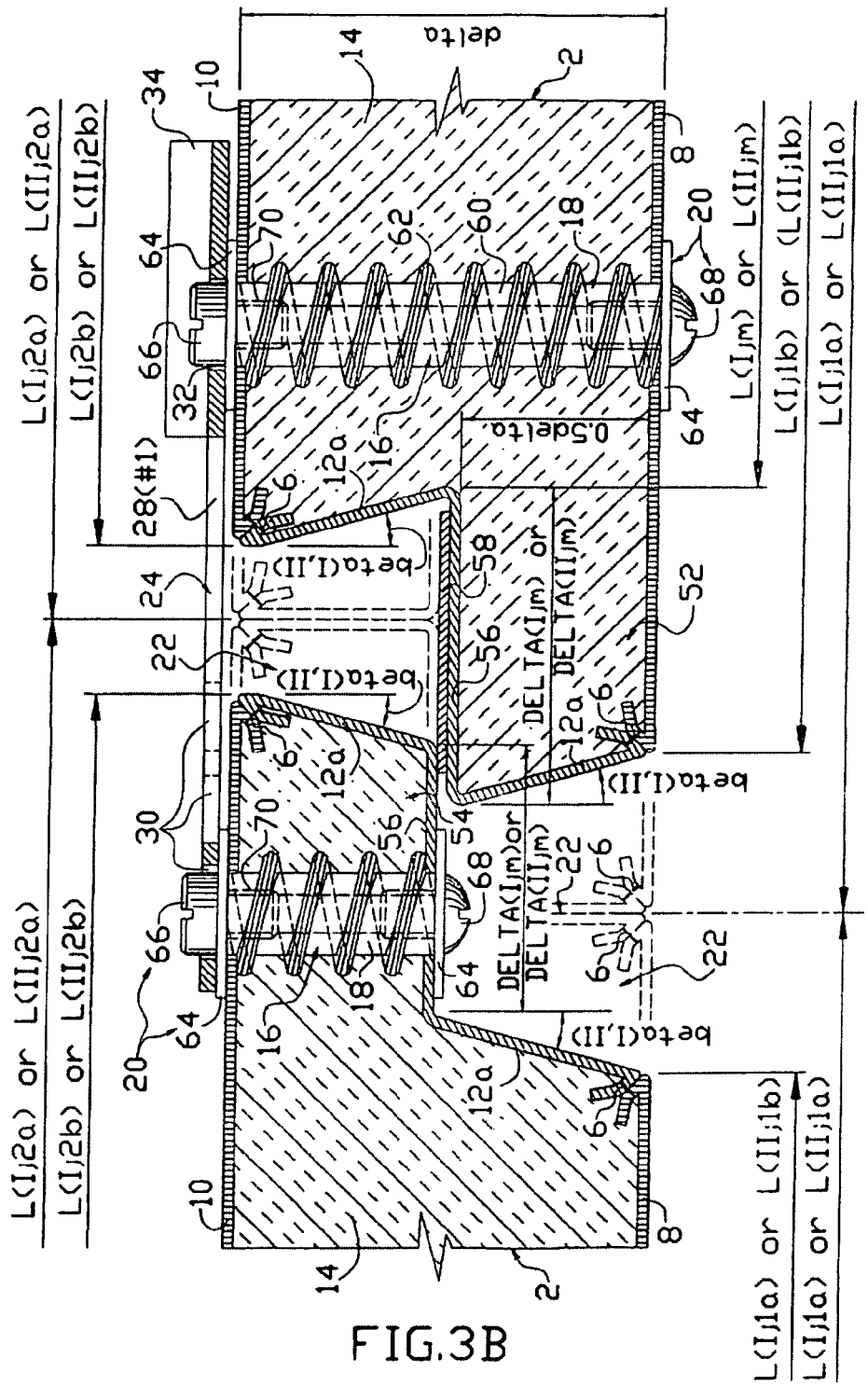
FIG. 3b shows a cross-section taken along lines II-II of FIG. 3a, wherein a direction of self-sealing movement is shown.

A second embodiment of the invention is shown in FIGS. 3a and 3b. The sides of the insulation sections 2 are made with bottom 52 and upper 54 ledges conformed from the side flexible layers 12 and overlapping each other at a level of an insulation section's 2 median surface. The formed ledges 52, 54 of the side flexible layers 12 represent two parallel inclined surfaces 12a overlapping at an intermediate horizontal flexible layer 56. The inclined surfaces 12a and the intermediate horizontal flexible layer 56 of each section invert to corresponding layers of the adjacent insulation sections 2. The bottom ledges 52 and, accordingly, the upper ledges 54 are placed in pairs on adjacent surfaces of side flexible layers 12a of the insulation sections 2. A layer of polished steel 58 foil is fixed (e.g., by means of a needle stitching) on the upper surface of the bottom ledges 52 on the flexible layer 56. The foil decreases a friction force between contact surfaces of the joined insulation sections. It simultaneously decreases heat losses through the bottom ledge due to a reflection of infrared radiation. An overlap of the ledges 52, 54 guarantees high reliability of the self-sealing assembling joints 22. The second embodiment is most practical when a thickness of the insulation sections 2 is greater than 100 mm.

The fastening means 16 of the second embodiment, shown in FIG. 3b, is a fastening rod fabricated form a heat resistant polymer having low thermal conductivity. It comprises a shape of a tube-like bushing 60 having a trapezoidal lead thread 62 located along the outlet bushing surface. The bushing 60 comprises a height that is equal to a distance between the bottom 8 and the upper 10 flexible layers when it is screwed into the insulation section(s) 2 and secured in place by fixing means 20. The fixing means 20 comprises two support steel washers 64 placed on each of the bushing 60 ends, a steel stud 66 installed from the flexible layer 10 side (it placed along the perimeter of the insulation sections 2 for fastening rods 18), a screw 68 from the flexible layer 8 side or two screws 68 from the sides of both flexible layers 8 and 10 (for other fastening rods 18) correspondingly. The screws 68 screw in the bushing 60 to form a self-tapping fastening thread on the inner bushing surface. It is suggested that the bushing 60 can be fabricated out of a fluoropolymer, s.a., a polytetrafluoroethylene (TEFLON® or TEXTOLITE™). The studs 66 are simultaneously used as a component of the connection means 24 with the plate-clamp 28.

Figure 4A:
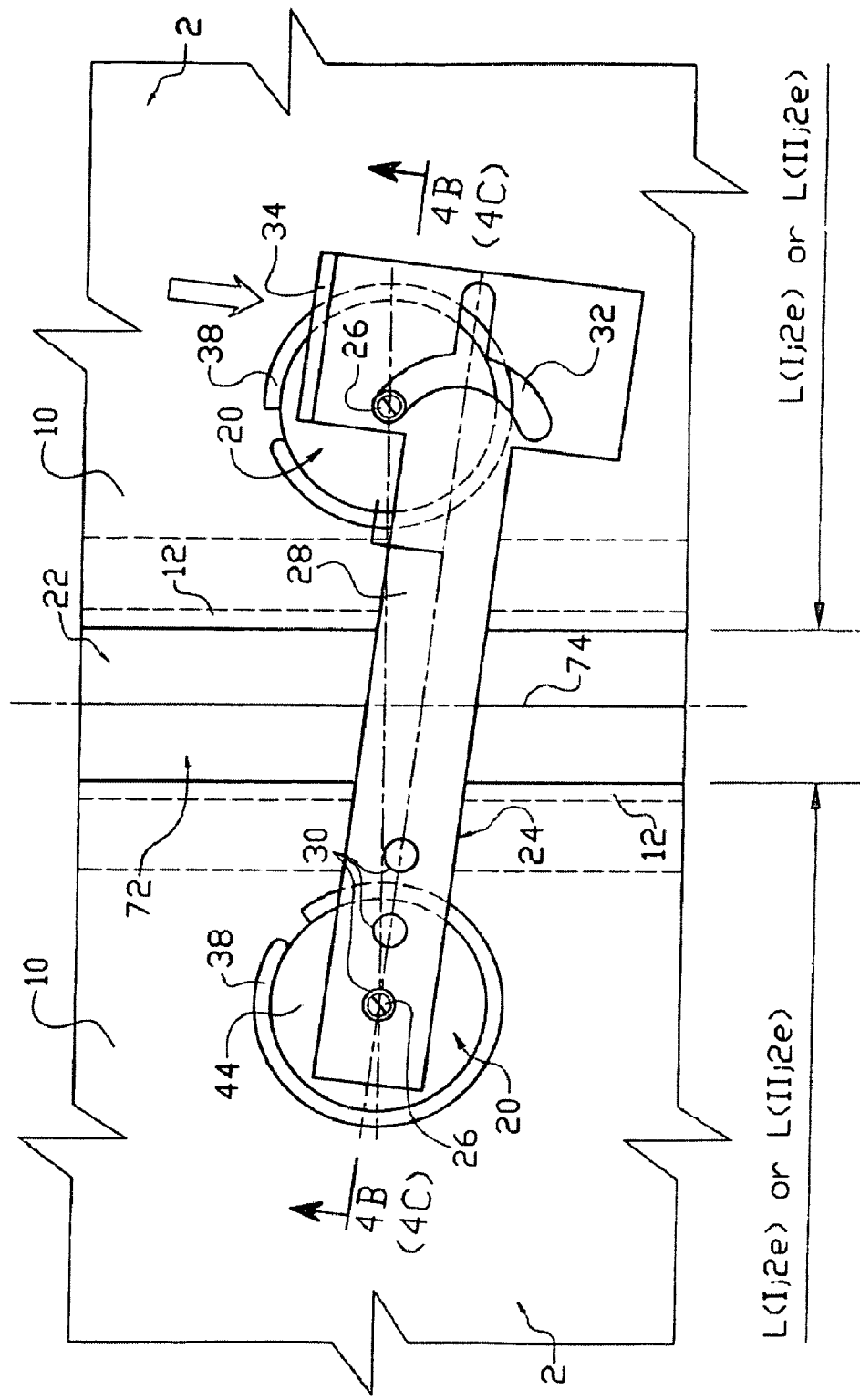
FIG. 4a is a partial view of insulation sections of the jacket of FIG. 1, wherein a third embodiment of the present invention shows a connection of adjacent insulation sections having an elastic, heat resistant, polymer filler braid insert.
Figure 4B:
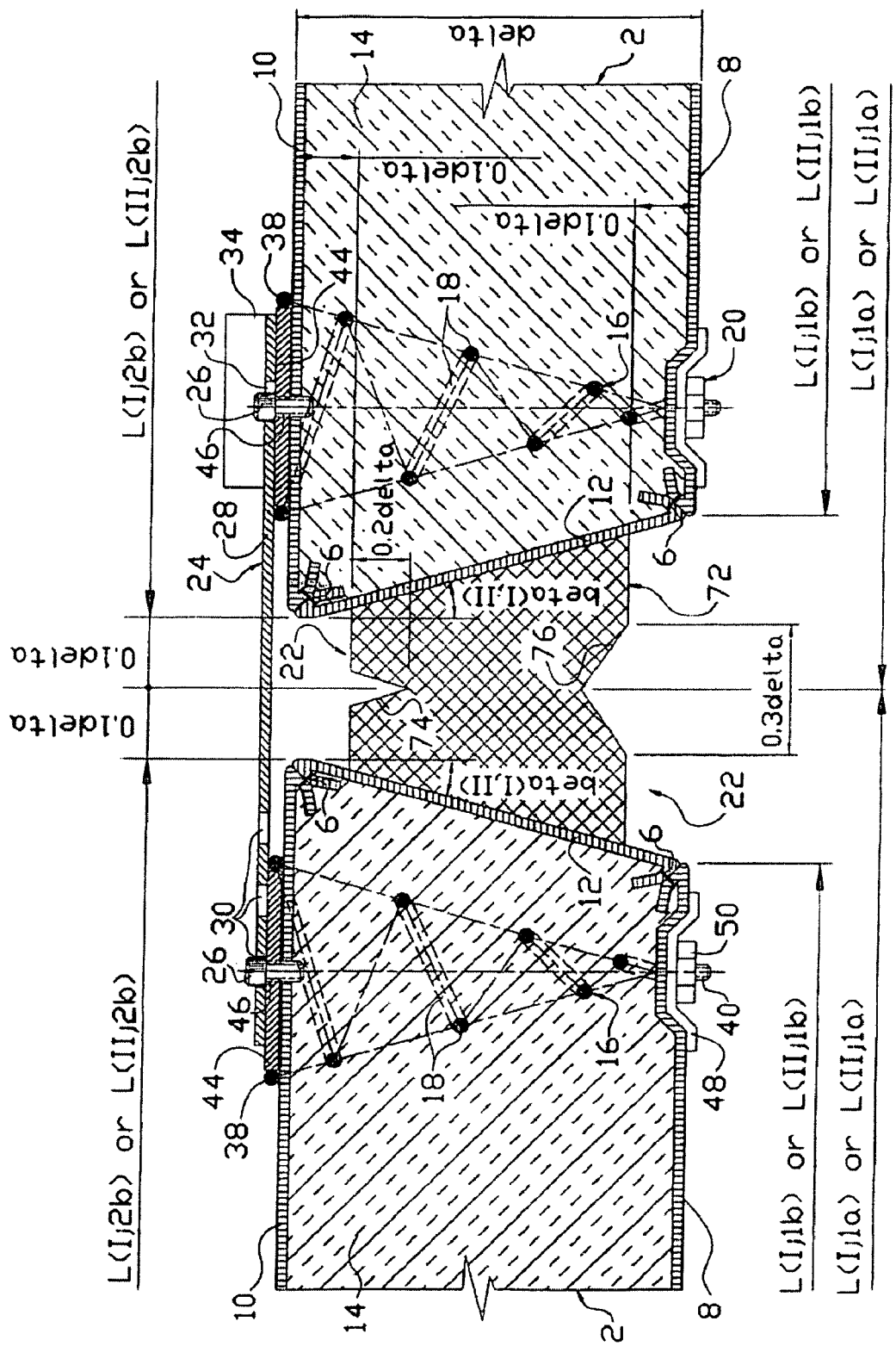
FIG. 4b shows a cross-section taken along lines III-III of FIG. 4a at a state of installation.
Figure 4C:
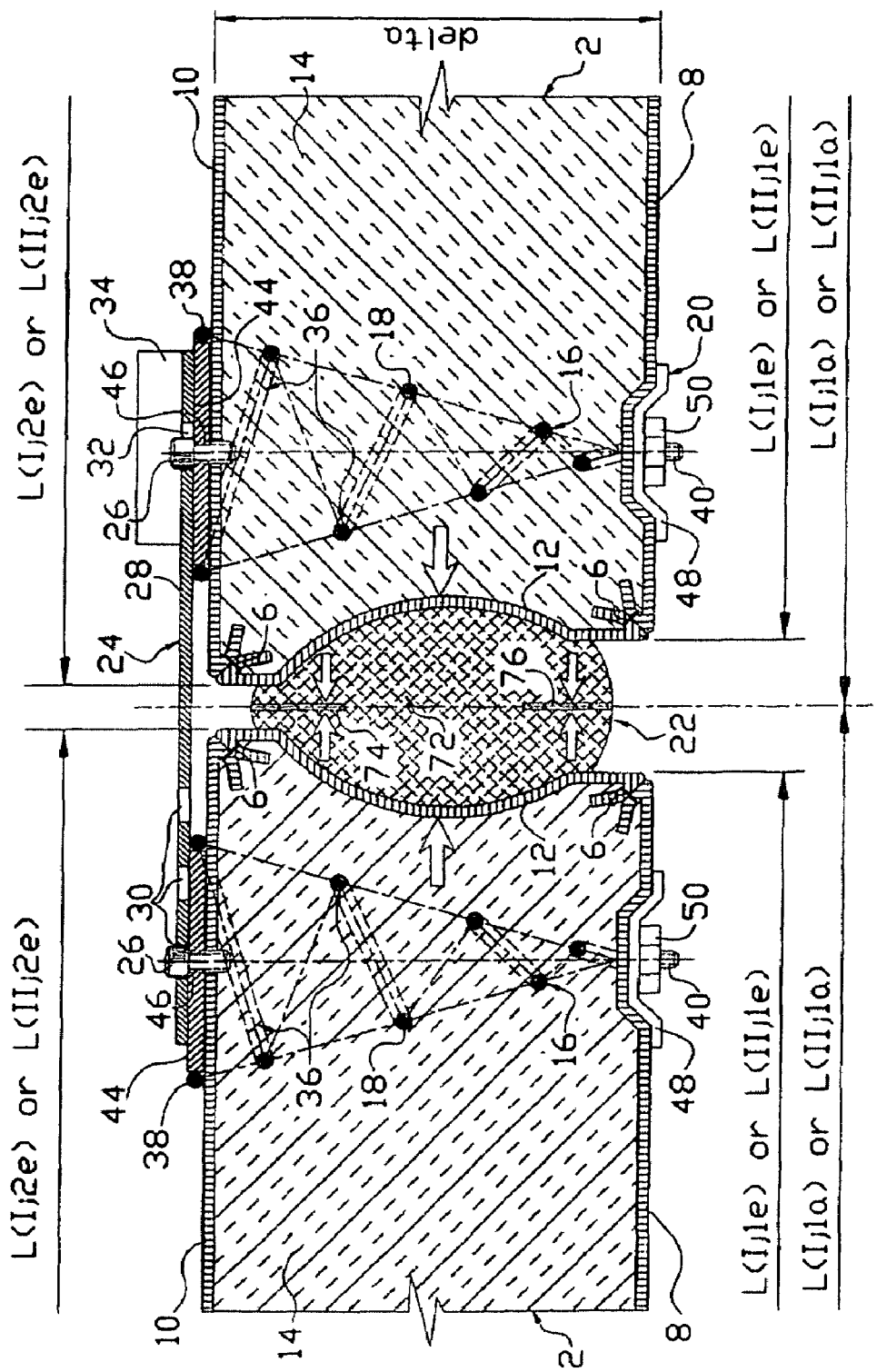
FIG. 4c shows a cross-section taken along lines III-III of FIG. 4a at a stage of operation.
Figure 5:
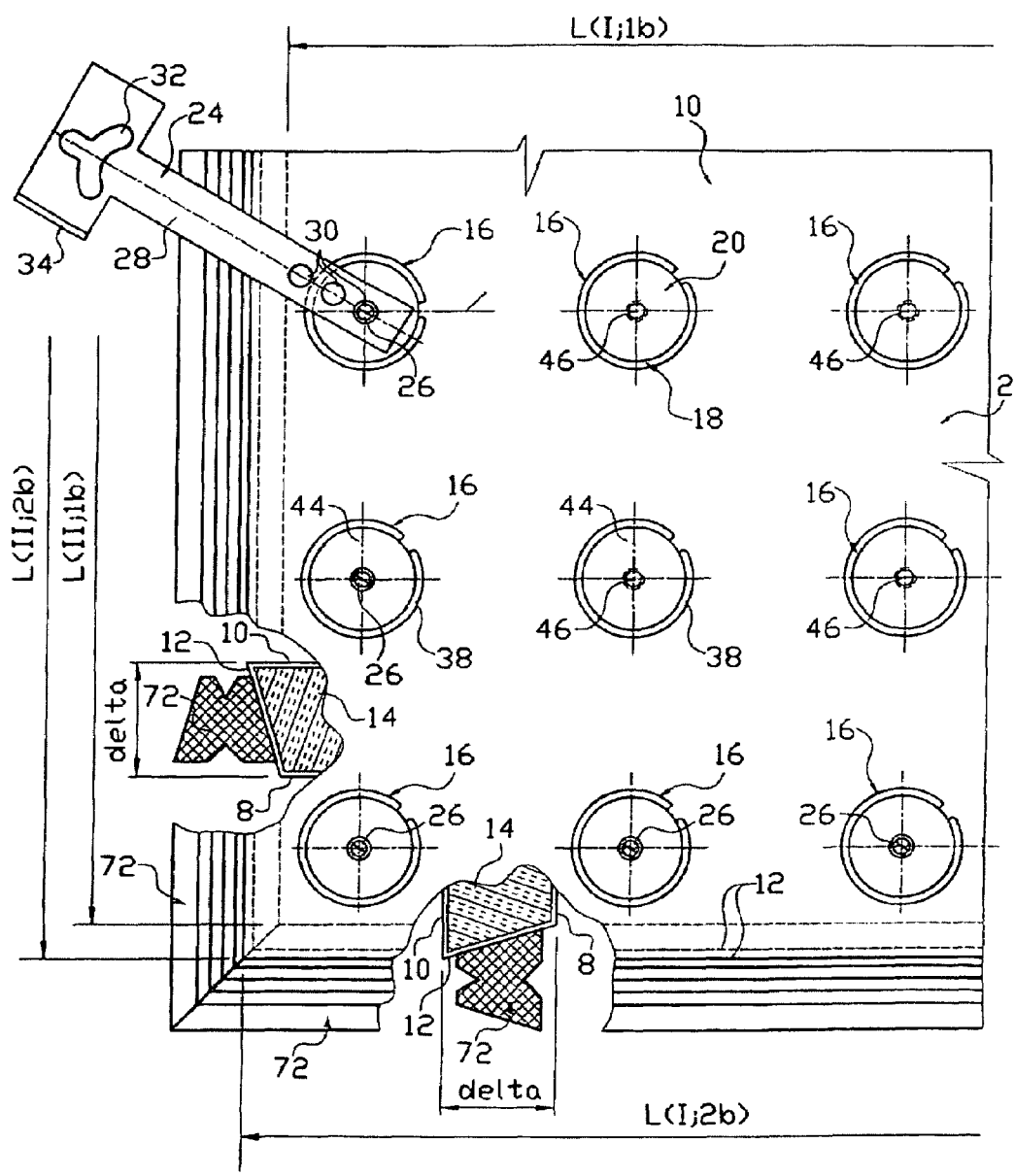

A third embodiment of the invention, shown in FIGS. 4a-c, comprises an elastic filler braid 72 fixed to and between two adjacent, inclined side flexible layers 12 of insulation sections 2. The braid 72 is formed from a heat resistant polymer. It is preferably fabricated from a silicone resin. There is no limitation to the means to fix the braid to each section; however, it is anticipated that an adhesive or a clamp means may be utilized. The braid 72 comprises a trapezoidal profile which corresponds to the inclinations of side flexible layers 12. They further comprise V-shaped cut-outs on the upper 74 and bottom 76 surfaces. A height of the elastic braid 72 is 10-20 mm less than the thickness of the whole insulation section(s) 2. Geometrical parameters of the insert-braid 72 are chosen so that to provide conditions at which the insert-braids completely fill the assembling joints 22 when they are deformed at heating. A partial view of the insulation section is shown in FIG. 5 comprising the braids 72 fixed on the adjacent, inclined side flexible layers 12.

FIG. 6 is a dimensions table for the sectional jacket, wherein the dimensions for characters referenced in the foregoing drawings are defined by formulas recited in the table. FIG. 7 further defines each reference character.

The parameters of the insulation sections 2 (calculated using formulas 1-3 in FIG. 6) provide for the assembling joints 22 to be self-sealing. To increase reliability, the bottom 8 and the upper 10 flexible layers fabricate with some positive tolerance, which is determined with empirical coefficients K(I;s) and K(II;s). In the present case, the length and the width of the flexible layers 8, 10 are such that they expand to seal the assembling joints 22 between the joining side flexible layers 12 of adjacent insulation sections 2. Considered are the different temperature linear expansion coefficients of both the material used to manufacture the flexible layers 8, 10 and the volume shrinkage of the middle insulating layer under heating. It should further be noted that by the 15-20% reduction of the assembling joint's 22 width, an additional joint compression can be achieved creating an almost hermetical joint. Experimental data makes it possible to compute formulas for sectional heat insulating jackets having almost hermetic assembling joints.

In essence, the assembling joints 22 are "self-sealing" until the inclined side flexible layers 12a of adjacent insulation sections 2 meet each other, wherein there is some reduction to coefficients K(I;s) and K(II;s) described in FIGS. 6 and 7. The ledges of the assembly joints 22 prevent their opening during operation, thus avoiding any unnecessary heat loss through the sectional heat insulating jacket according to this invention.

The foregoing descriptions of specific embodiments of the present invention are presented for the purposes of illustration and description. They are not intended to be exhaustive nor to limit the invention to the precise forms disclosed and, obviously, many modifications and variations are possible in light of the above teaching. The embodiments are chosen and described in order to best explain the principles of the invention and its practical application, namely, to thereby enable others skilled in the art to best utilize the invention and its various embodiments with various modifications as are suited to the particular uses contemplated. It is intended that the scope of the invention be defined by the Claims appended hereto and to their equivalents. The scope of the invention is therefore to be limited only by the following claims.

Having thus described the invention what is claimed as new and desired to be secured by Letters Patent is as follows:

1. An insulating jacket comprises at least two adjacent insulation sections having assembling joints between them, said insulating jacket comprises:
    a closed, polyhedral, protective housing, said housing comprising:
        a bottom flexible layer, said bottom layer inverts to insulate a hot surface of an entity;
        an upper flexible layer, said upper layer is equally spaced from said bottom layer along an entire surface of said insulation section; and,
        all side flexible layers, said side layers incline under a sharp angle to said top layer at a stage of installation, and said side layers are perpendicular to surfaces of both said bottom and said upper layer at a stage of operation;
    a middle, semi-rigid insulation forming layer, said middle layer is placed inside said housing; and,
    a fastening means, said fastening means is equidistant on each of said insulation sections, said fastening means comprises a fixing means to fasten rods on said surface of said insulation sections and to secure constant and uniform section's thickness while simultaneously binding layers together;
    wherein said adjacent insulation sections separate by means of assembling joints and they connect by connection means distributed along a joining perimeter of said sections.

2. The insulation jacket of claim 1, wherein said connection means comprise special studs which are fixed on said fastening rods and coupled with a special plate-clamp.

3. The insulation jacket of claim 2, wherein said plate comprises:
    a T-form shape having at least two round holes at said plate's narrow end and an arched slot at a broader, opposite end; and,
    a flange comprised on said broad end of the plate turns said plate around one of said fastening rods;
    wherein during each of an intermediate step of heating, the side layers of said adjacent insulation sections approach such that mutual positions of said fastening means gradually fasten to a final position after said assembling joint.

4. The insulation jacket of claim 3, wherein said fastening rods are fixed on both said bottom and said upper layers by said fixing means such that they screw into said insulation section's bodies to join said layers, said fastening and said fixing means cause said upper and said bottom layers to move towards said assembling joints during heating, wherein a movement is accomplished from a side of said bottom layer without a protrusion of said upper layer.

5. The insulation jacket of claim 4, wherein said fastening rod is manufactured from a heat-resistant stainless steel and comprises a conical helical spring having a height equal to a thickness of said insulation sections, said fastening rod further comprises a flat coil at a spring base and a straight axial part with a thread at an opposing end.

6. The insulation jacket of claim 5, wherein a length of said conical spring when it is uncoiled is 2 to 6 times greater than said thickness of said overall insulation sections.

7. The insulation jacket of claim S, wherein said fixing means comprises:
    an abutment washer having a threaded hole and said washer rigidly fixed in a center of said flat coil; and,
    a self-locking washer and a locking nut screwed with a thread on said straight axial part of said spring;
    wherein fastening stud screws into said abutment washer.

8. An insulating jacket comprises at least two adjacent insulation sections having assembling joints between them, said insulating jacket comprises:
    a closed, polyhedral, protective housing, said housing comprising;
        a bottom flexible layer, said bottom layer inverts to insulate a hot surface of an entity;
        an upper flexible layer, said upper layer is equally spaced from said bottom layer along an entire surface of said insulation section;
        side flexible layers comprising both bottom and upper ledges, said side layers incline under a sharp angle to said top layer at a stage of installation, said side layers are perpendicular to surfaces of both said bottom and said upper layer at a stage of operation;
    a middle, semi-rigid insulation forming layer, said middle layer is placed inside said housing; and,
    a fastening means, said fastening means is equidistant on each side of said insulation sections;
    wherein said bottom ledges and said upper ledges are placed in pairs on adjacent surfaces of said side layers, said bottom and said upper ledges conform from said side layers and overlap each other at a level of an insulation section's median surface.

9. The insulating jacket of claim 8, wherein said ledges represent two parallel surfaces overlapping at an intermediate horizontal layers, said surfaces and said intermediate horizontal layers invert to corresponding layers of said adjacent insulation sections.

10. The insulating jacket of claim 9, further comprising a layer of polished steel foil on said upper surface of said bottom ledges.

11. The insulating jacket of claim 8, wherein said fastening means is a rod fabricated form a heat resistant polymer having low thermal conductivity, said rod comprises a shape of a tube-like bushing having trapezoidal lead thread located along the outlet bushing surface.

12. The insulating jacket of claim 11, wherein said bushing of said fastening rod is fabricated from a fluoropolymer.

13. The insulating jacket of claim 11, wherein said bushing comprises a height that is equal to a distance between said bottom and said upper layers when it is screwed into said insulation sections.

14. The insulating jacket of claim 13, wherein a side of said sections' upper layers are fixed at said layers' surfaces with a fixing means, said fixing means comprises:
    two support steel washers placed on each end of said bushing;
    a steel stud installed from said upper layer side, said stud is placed along a perimeter of said insulation sections for fastening rods; and,
    at least one screw from said bottom layer's side, a second screw for a side of said upper layer;
    wherein said screws screw in said bushing to form a self-tapping fastening thread on an inner bushing surface.

15. An insulating jacket comprises at least two adjacent insulation sections having assembling joints between them, said insulating jacket comprises:
    a closed, polyhedral, protective housing, said housing comprises;
        a bottom flexible layer, said bottom layer inverts to insulate a hot surface of an entity;
        an upper flexible layer, said upper layer is equally spaced from said bottom layer along an entire surface of said insulation section;
        all side flexible layers comprising both bottom and upper ledges, said side layers incline under a sharp angle to said top layer at a stage of installation, and said side layers are perpendicular to surfaces of both said bottom and said upper layer at a stage of operation;
    a middle, semi-rigid insulation forming layer, said middle layer is placed inside said housing;
    a fastening means, said fastening means is equidistant on each of said insulation sections; and,
    an elastic braid fixed to and between said side layers of said insulation sections.

16. The insulating jacket of claim 15, wherein said braid is formed from a heat resistant polymer.

17. The insulating jacket of claim 15, wherein said braid comprises:
    a trapezoidal profile which corresponds to inclinations of said side layers; and,
    V-shaped cut-outs on an upper and a bottom surface.

18. The insulating jacket of claim 15, wherein a height of said elastic braid is 10-20 mm less than a thickness of a whole of said insulation sections.

19. The insulating jacket of claim 15, wherein said elastic braid is fabricated from silicone resin.

* * * * *